Jan. 21, 1969   H. A. JONES   3,422,495
MEANS FOR MAKING CURVED OPTICAL AND REFLECTIVE SURFACES
Original Filed June 22, 1964
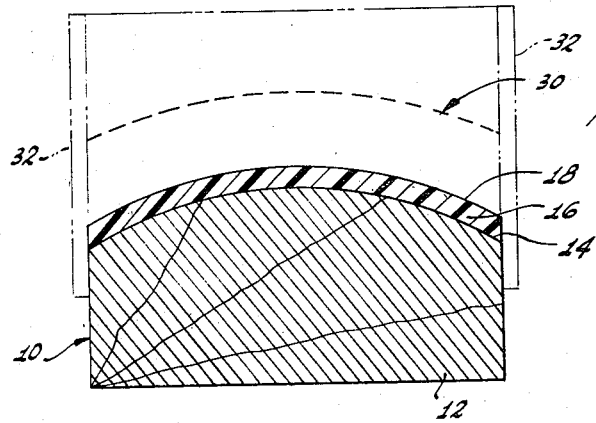
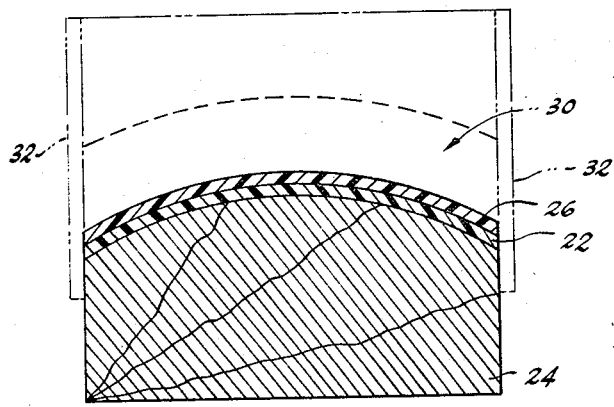
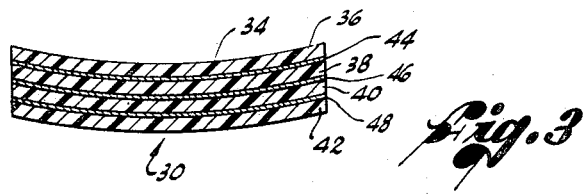
INVENTOR.
HAROLD A. JONES
BY Fulwider, Patton, Rieber, Lee, and Utecht
ATTORNEYS

3,422,495
MEANS FOR MAKING CURVED OPTICAL AND REFLECTIVE SURFACES

Harold A. Jones, Oildale, Calif., assignor to Fortin Plastics, Inc., Saugus, Calif., a corporation of California
Original application June 22, 1964, Ser. No. 376,669, now Patent No. 3,317,640, dated May 2, 1967. Divided and this application Nov. 15, 1966, Ser. No. 608,472
U.S. Cl. 18—47   5 Claims
Int. Cl. B29c 1/02; B28b 7/34

ABSTRACT OF THE DISCLOSURE

A mold for making plastic parts having curved optical surfaces comprising a shaped base, a resilient, finely-celled foam or rubber layer placed over the mold base, and a plastic sheet placed over the resilient layer and having at least one glass-polished surface for contact with a plastic material which is to be molded.

CROSS-REFERENCE TO RELATED APPLICATIONS

This is a divisional of patent application of the instant inventor entitled, "Method and Means for Making Curved Optical and Reflective Surfaces," Ser. No. 376,669, filed June 22, 1964, now issued as U.S. Patent No. 3,317,640, issued May 2, 1967, and entitled, "Method of Making Curved Optical and Reflective Surfaces."

This invention relates generally to a novel means for making curved surfaces, and relates especially to a novel means for the making of curved optical and reflective elements of large diameter.

The making of curved surfaces of large diameter to close tolerances, where optical or reflective properties are important, are extremely expensive. The master mold, from which such a curved surface is formed, is usually made of finely ground and polished glass. While the tolerances can be executed to a very fine degree in this manner, the production of glass master molds of diameters of greater than about 24 inches necessitates a great number of very critical, painstaking hours of labor.

In view of the foregoing, it is a major object of this invention to provide a means for producing curved surfaces having close tolerances and having surfaces substantially free of distortion and thereby suitable for many optical and reflective uses, which means is very substantially lower in cost than that obtained by conventional means, and which means permits molds to be manufactured much more rapidly than in the past.

It is a further object of the present invention to provide a master mold which can be made to very close tolerances, suitable for use in the making of many curved shapes for optical and reflective use, which master mold is not made of glass, and which is much less expensive to make as compared to a ground glass mold.

These and other objects of my invention will become readily understood with reference to the detailed description herein set forth, and to the accompanying drawings, wherein:

FIGURE 1 is a schematic drawing of one embodiment of a mold of my invention;

FIGURE 2 is a schematic drawing of a second embodiment of a master mold of my invention; and FIGURE 3 is a cross-section through a finished element prepared in accordance with my invention.

In general, it has been found that wood, plaster of Paris, or other readily shaped material can be employed in the making of a master mold, in combination with a cast plastic sheet having a smooth surface. Thus, the counterpart of the desired curvature and shape of the part to be made is first made in wood, plaster of Paris, or other readily shaped material. Then, a smooth plastic sheet, e.g., polymethyl methacrylate, is softened, by heating, and draped over the wood or plaster of Paris mold, and thereby conforms to the mold. The tolerances can be kept very close by these relatively simple and inexpensive procedures. The combination of the wood, or plaster of Paris base mold with the conforming plastic sheeting operates effectively as the master mold from which plastic curved surfaces can be built up. Such plastic surfaces have almost the same surface characteristics to that of a surface produced from a ground glass master mold, although the tolerances will not be quite as fine.

Minute imperfections sometimes appear in the finished part due to minute imperfections in the wood or plaster of Paris mold, which imperfections may be transmitted through the plastic sheet. These imperfections can be substantially eliminated by fixedly placing a very fine cellular foam rubber or foam plastic sheet or layer directly upon the wood or plaster of Paris mold, and then draping the smooth plastic sheet over the foam layer.

Referring now to the drawings, one embodiment of a master mold of this invention is shown, and is designated generally by the numeral 10. The master mold preferably comprises a wooden or plaster of Paris base. A wooden base 12 is specifically shown in FIGURE 1, which has a desired curvature formed thereon. The surface 14 of the wooden base 12 is sanded smooth, and is readily formed to a tolerance of ±0.005 inch or less.

A smooth cast plastic sheet 16, such as an acrylic resin sheet (e.g., polymethyl methacrylate, manufactured by Rohm & Haas under the trademark Plexiglas) is heated in an oven (not shown) to a temperature at which the material becomes pliable. This temperature usually lies substantially above the heat distortion point of the particular thermoplastic, and generally ranges between 290° and 400° F. for acrylic materials. For polymethyl methacrylate (Plexiglas 55), the preferred heating temperature is about 290° F. to 360° F. Other types of smooth cast plastic sheets can also be employed, such as Mylar® (a polyester formed by the condensation reaction between ethylene glycol and terephthalic acid) and cast polyvinyl chloride sheet.

The smoothness of the plastic sheet is an important consideration in this invention, and it is therefore preferred that the plastic sheet be made by being cast, in liquid form, against at least one glass surface. Plastic sheeting formed in this manner has what will be termed herein, and in the claims, as a glass-smooth surface. The cast sheeting employed in this invention is manufactured to close thickness tolerances on the order of ±0.01 to ±0.001 inch for thicknesses of ¼ inch or less. For the purpose of this invention, sheet thicknesses of between ⅛ inch and ½ inch are preferred.

The glass-smooth plastic sheet 16 is then heated to its forming temperature and if the curvature shape is simple, the sheet 16 is placed on the base 12 without any clamping or hold-down means being necessary for the sheet to conform to the surface curvature of the base 12. If the surface curvature of the base 12 is compound, or otherwise complex, conventional clamping or "hold-down" means may be employed (not shown) to insure that the heated plastic sheet conforms to the surface curvature of the base 12.

The master mold just described with reference to FIGURE 1 is then ready for use in the manufacture of optical and reflective elements. If an epoxy resin element is to be manufactured, a conventional parting agent is first usually applied to the exposed surface 18 of the plastic sheet 16, such as a silicone fluid (e.g., Dow Corning Fluid 20) or a silicone emulsion (Dow Corning 231), various waxes or fatty acids. A conventional admixture of epoxy resin, curing agent and fillers are then applied to the surface 18 of the master mold 10 and a build-up of various layers of epoxy resin, reinforcing material such as fiber glass mat, rigid foam, or honeycomb structure is provided.

The formed element is shown in dotted line in FIGURE 1, and is designated by the numeral 30.

The element 30 may be confined by walls 32, shown in phantom, but this is not necessary, as the build-up of the element can proceed without the necessity of confining the resin and other materials forming the element 30.

After the element 30 has been built up, it is allowed to cure and then is released from the master mold 10. Referring now to FIGURE 3, the surface 34 of the element 30, adjacent the surface 18 of the master mold 10, is substantially identical to the glass-smooth surface 18 of the master mold. The element 30 may then be used directly as an optical element, or may be provided with a reflective coating which may be of silver or aluminum, and which is deposited in a conventional manner. The element 30, as shown in FIGURE 3, has cured epoxy layers 36, 38, a reinforcing rigid foam layer 40, and a final epoxy layer 42 between which layers are glass mat layers 44, 46 and 48.

In order to smooth out any surface irregularities in the base mold member 12 of the master mold 10, and to prevent any such imperfections from showing upon the finished element, a plastic or rubber foam layer may be interposed between the plastic sheet and the base mold member of the master mold. Referring now to FIGURE 2, a master mold 20 is there shown which has been modified by the interposition of a foam layer 22 between base mold member 24 and formed plastic sheet 26.

The foam has the following characteristics: (1) it is resilient, (2) it has a softening or melting point above the forming temperature of the plastic sheet, and (3) it is very fine-celled. Due to the resiliency of the foam, inaccuracies or imperfections in the base mold member are "smoothed out," while the cell pattern of the foam does not show up in the surface of the finished product.

It is presently preferred to use a layer of resilient, nonfibrous interconnected or open fine-celled polyester urethane foam of 1 to 3 pounds per square foot density, or silicone rubber foam. These foams have a useful operating temperature above the minimum forming temperature of the plastic sheet employed. Generally speaking, the urethane foams are reaction products of polyisocyanates (e.g., toluene diasocyanate) and a hydroxyl rich material (e.g., polyether glycols or adipic acid polyesters). Silicone rubbers are reaction products of dimethyldichlorosilane with diphenyldichlorosilane.

The foam layer generally ranges between ⅛ inch and ½ inch in thickness. About a ¼ inch material thickness is preferred.

The following examples of the means for forming a reflective optical element of large diameter will now be set forth. These examples are illustrative of my means, and are not to be construed as limiting in any way.

*Example 1*

A male plaster of Paris mold of the desired shape, and 5 feet in diameter, is sculpted and worked smooth to a tolerance of ±0.005 inch. The degree of curvature, in cross-section of the plaster mold, was substantially the same as that of the base wooden mold 12 shown in FIGURE 1. A ⅛ inch sheet of Plexiglas G (manufactured by Rohm & Haas) which has been cast against glass so as to have both surfaces thereof glass-smooth and with very small thickness deviation (of the order of 0.001 inch) is heated in an oven to a temperature of 300° F. At this temperature, the sheet is very pliable. The heated sheet is then draped over the plaster mold. Clamping means are not required as the desired curvature is not complex.

The master mold consisting of a male plaster base mold covered by a conforming cast sheet of Plexiglas G is now completed, and the manufacture of optical or reflective elements may commence.

To this end, a parting agent (Dow Corning Fluid 20) is first brushed over the exposed surface of the master mold. A conventional curing admixture of an epoxy resin and curing agent is then sprayed over the exposed surface of the master mold. The epoxy resin admixture has the following composition:

| | Parts by wt. |
|---|---|
| Epoxy resin (Epon® 828, Shell Chemical Co.) | 100 |
| Curing agent (Apco Hardener #180 Applied Plastics, Los Angeles) | 20 |
| Fillers (e.g., aluminum oxide, magnesium oxide) | 40 |

A thickness of approximately 0.05 inch is built up and a glass fiber mat is then layed-up into the epoxy layer. A second layer of the above-described formulation is built up so that the overall thickness of the two epoxy layers and the glass mat layer is approximately ⅛ inch in thickness. A rigid urethane foam layer, ⅛ inch in thickness, is then layed into the second epoxy layer. A final fibrous glass mat layer, and a final epoxy layer are then layed up. The overall thickness built up is ¼ inch.

The optical element so formed is cured at room temperature, and after curing is released from the master mold by positive pressure.

The optical element thus produced is then vacuum metallized with aluminum in a conventional manner, and the element is completed except perhaps for minor finishing operations.

The reflective element, so formed, is of excellent quality and the master mold can be reused a great number of times, e.g., on the order of a dozen times, without any appreciable change in quality.

*Example 2*

A male wooden base mold, 6 feet in diameter, is formed as shown in FIGURE 1. The concave surface of the mold is well sanded to achieve a very smooth surface, and a deviation of less than ±0.005 inch. A ¼ inch thick polyester urethane fine-cell, resilient foam (Nopco foam®, 2# cu./ft. density, manufactured by Nopco Chemical Company, Plastics Division, North Arlington, N. J.) is then mounted onto the exposed concave surface of the base mold by a rubber base adhesive (EC 1357, manufactured by Minnesota Mining and Manufacturing Co., St. Paul, Minn.).

A glass-smooth cast sheet of Plexiglas 55 (Rohm & Haas), ¼ inch in thickness, is then heated to a forming temperature of 290° F. and is draped over the Nopcofoam® layer, and conforms thereto without the need for external positive pressure or clamping means.

The optical element build-up is followed, as described in Example 1, after a parting or release agent, DC Fluid 20 (manufactured by Dow Corning Corporation) is spread over the exposed surface of Plexiglas 55.

The element is released as in Example 1 and is ready for metallizing. A reflective element is thus produced.

*Example 3*

The process of Example 2 is followed except that a ¼ inch sheet of Plexiglas 5009 (Rohm & Haas) is substituted for the Plexiglas 55 sheet.

*Example 4*

The process of Example 2 is followed except that a ¼ inch sheet of Plexiglas II UVT (Rohm & Haas) is substituted for the Plexiglas 55 sheet.

*Example 5*

The master mold of Example 2 is utilized to make a clear Plexiglas G optical lens element. A parting agent, DC Fluid 20 (manufactured by Dow Corning) is first spread over the exposed surface of the Plexiglas G although a parting agent is not a necessity in this case. The Plexiglas G is heated to 290° F. and then draped over the master mold. Upon cooling, it is released from the master mold, under pressure, and is as clear and free of distortion as the Plexiglas surface of the master mold.

I claim:
1. A mold for the manufacture of optical and reflective elements, which comprises:
   a base mold of readily formed material and having a mold surface of predetermined curvature;
   a fine celled, thin, resilient foam layer mounted onto said mold surface and conforming to the curvature thereof, said foam layer having a substantially uniform thickness and having a softening point above the foaming temperature of
   a cast plastic sheet mounted to said foam layer and conforming to the curvature thereof, the exterior exposed surface of said sheet being glass-smooth.
2. The mold of claim 1 wherein said base mold is made from a readily formed material selected from the group consisting of wood and plaster of Paris.
3. The mold of claim 1 wherein said cast plastic sheet has a thickness of between ⅛ inch and ½ inch.
4. The mold of claim 1 wherein said cast plastic sheet is a polymethyl methacrylate sheet.
5. The mold of claim 1 wherein said foam is a polyester urethane foam having a density of 1–3 pounds per cubic foot, and said cast plastic sheet is polymethyl methacrylate.

References Cited

UNITED STATES PATENTS

| | | |
|---|---|---|
| 1,495,206 | 5/1924 | Ruppel. |
| 2,230,118 | 1/1941 | Moulton. |
| 2,292,917 | 8/1942 | Williams _____ 249—79 X |
| 2,339,433 | 1/1944 | Staehle. |
| 2,336,578 | 12/1943 | Skoning _____ 249—112 |
| 2,652,595 | 9/1953 | Kish. |
| 2,763,049 | 9/1956 | Peebles _____ 25—122 X |
| 2,776,453 | 1/1957 | Kish. |
| 2,965,946 | 12/1960 | Sweet et al. _____ 251—122 X |
| 3,118,960 | 1/1964 | Cook. |
| 3,211,811 | 10/1965 | Lanman _____ 18—39 X |
| 3,248,758 | 5/1966 | Schmitz et al. _____ 18—47 X |

FOREIGN PATENTS

| | | |
|---|---|---|
| 614,855 | 2/1961 | Canada. |
| 898,416 | 6/1962 | Great Britain. |

J. HOWARD FLINT, Jr., *Primary Examiner.*

U.S. Cl. X.R.

18—35; 249—115, 134

UNITED STATES PATENT OFFICE
CERTIFICATE OF CORRECTION

Patent No. 3,422,495 January 21, 1969

Harold A. Jones

It is certified that error appears in the above identified patent and that said Letters Patent are hereby corrected as shown below:

Column 5, line 14, "foaming" should read -- forming --.

Signed and sealed this 31st day of March 1970.

(SEAL)
Attest:

Edward M. Fletcher, Jr.
Attesting Officer

WILLIAM E. SCHUYLER, JR
Commissioner of Patents